United States Patent Office 2,909,494
Patented Oct. 20, 1959

2,909,494

PROCESS FOR RESINIFYING POLYEPOXIDES AND RESULTING PRODUCTS

Harvey L. Parry and James E. Carey, Maplewood, N.J., assignors to Shell Development Company, New York, N.Y., a corporation of Delaware No Drawing. Application November 22, 1955
Serial No. 548,552

14 Claims. (Cl. 260—18)

This invention relates to a process for resinifying polyepoxides. More particularly, the invention relates to a new process for resinifying polyepoxides with amine-type curing agents using a special class of activators for the curing agents, and to the resulting cured products.

Specifically, the invention provides a new process for resinifying and curing polyepoxides, and preferably glycidyl polyethers of polyhydric phenols and polyhydric alcohols, which comprises mixing and reacting the polyepoxide with an amine-type curing agent and an activator for the curing agent comprising a Lewis acid such as a metal halide, $BF_3$ of $BF_3$ complex, and preferably a $BF_3$-amine or a $BF_3$-phenol. The invention further provides cured products obtained by the above-described process.

It is known that certain amine-type materials may be used as curing agents for polyepoxides, such as the commercially available glycidyl polyethers of polyhydric phenols. These curing agents, however, have certain undesirable properties which have placed a considerable limitation on their commercial utilization. Many of the amine-type curing agents, for example, show little activity in the cure of the polyepoxides at or near room temperature and can be used only at the higher temperatures. Even at the high reaction temperatures, these curing agents in many cases act very slowly and are unable to be used in compositions which must be cured rapidly. Furthermore, the product obtained by the use of the amine-type curing agents are sometimes deficient, particularly as to hardness and durability.

It is an object of the invention to provide a new process for resinifying and curing polyepoxides. It is a further object to provide a new process for curing polyepoxides to form cross-linked products using amine-type curing agents and a special class of activators for these curing agents. It is a further object to provide a new process for curing polyepoxides with amine-type curing agents that gives the desired product in a much shorter period of time. It is a further object to provide a new process for curing polyepoxides with amine-type curing agents that gives a rapid rate of cure even at low temperatures. It is a further object to provide a method for resinifying polyepoxides that gives cured products having improved properties. These and other objects of the invention will be apparent from the following detailed description thereof.

It has now been discovered that these and other objects are accomplished by the process of the invention comprising mixing and reacting the polyepoxide with an amine-type curing agent, and preferably a polyamine, amino-containing polyamide or an adduct of a polyamine and a monoepoxide, and an activator for the said curing agents comprising a Lewis acid such as a metal halide, $BF_3$ and $BF_3$ complex and preferably a $BF_3$-amine or a $BF_3$-phenol. It has been found that when the amine-type curing agents are used in combination with the above-noted activators they display surprisingly high activity as curing agents for the polyepoxides, and particularly those having terminal epoxy groups such as the glycidyl polyethers of the polyhydric phenols and polyhydric alcohols, over a wide range of temperatures. This combination, for example, gives a very rapid rate of cure even at the lower temperatures and is particularly suited for use in the preparation of rapid drying surface coatings. Additional advantage is also found in the fact that the products obtained by the use of the activators are improved in hardness and durability over the amine-type cured products.

The amine-type curing agents used in the process of the invention may be any of the epoxy-curing agents possessing a plurality of hydrogen attached to amino nitrogen. Examples of these include the aliphatic, cycloaliphatic and aromatic amines containing a plurality of hydrogen attached to nitrogen. Examples of the aliphatic and cycloaliphatic amines include, among others, ethylene diamine, diethylene triamine, hexamethylene diamine, triethylene tetraamine, 1,8-diamino octane, 1,12-diaminododecane, 1,6-diaminocyclohexene, 1,5-diaminocyclopentane and the like, and mixtures thereof.

Examples of aromatic polyamines that may be used in the process of the invention include, among others, ortho, meta and para-phenylene diamine, diaminodiphenylmethane, p,p'-methylene dianiline, triaminobenzene, 2,4-diaminotoluene, 3,3'-diamino diphenyl, 1,3-diamino-4-isopropylbenzene, 1,3-diamino-4,5-diethylbenzene, diaminostilbene, and the like. Particularly preferred aromatic polyamines include those of the formulae $X(NH_2)_n$ and $(NH_2)_m XRX(NH_2)_m$ wherein X is a polyvalent aromatic hydrocarbon radical, preferably containing from 6 to 12 carbon atoms, R is a bivalent aliphatic hydrocarbon radical, preferably containing 1 to 6 carbon atoms, $n$ is an integer of at least 2, and preferably 2 to 4, and $m$ is an integer of at least 1, and preferably 1 to 3.

Mixtures of the aromatic polyamines may also be used, and in some cases it is desirable to use such mixtures. Thus, mixtures of normally solid diamines, or of a normally solid and a normally liquid diamine may be prepared in such proportions that they are liquid at the normal working temperatures. Eutectic mixtures are advantageous on occasion. For example, a mixture of about 70 to 80% meta-phenylene diamine and 20 to 30% ortho-phenylene diamine has a melting point of only about 43° C. and is useful for this reason. Other desirable eutectic mixtures include the mixture of meta-phenylene diamine and meta-aminophenol containing about 63% of the former which melts at about 24° C., and the mixture of meta-phenylene diamine and meta-dinitrobenzene containing about 55% of the former and melts at 37° C. Mixtures of meta-phenylene diamine and p,p'-diaminodiphenylmethane (p,p'-methylene dianiline) in weight ratios between about 40:60 and 80:20 are especially desirable. A eutectic mixture of from 60 to 70% meta-phenylene diamine, 40 to 30% p,p'-diaminodiphenyl methane is a stable liquid for 5 to 6 days at 20 to 30° C. after preparation. More complex eutectic mixtures containing meta-phenylene diamine and two or more other substances may also be used.

Other examples of amine-type curing agents to be used in the process of the invention include the polyamides containing free amino groups such as may be obtained by reacting a polycarboxylic acid with a polyamine in such proportions as to give products having free amino groups. Polycarboxylic acids used for this purpose are preferably the aliphatic polycarboxylic acids and still more preferably the polymeric fatty acids such as the polymerized fatty acids resulting from the polymerization of drying or semi-drying oils, or the free acids or simple aliphatic alcohol esters thereof. Suitable drying or semi-drying oils include soybean, linseed, tung, perilla, oiticica, cottonseed, corn, tall, sunflower, safflower, dehydrated caster oil, and the like.

The polyamines used in making the polyamides are preferably the aliphatic primary or secondary amines containing at least two amino groups, such as, for example, diethylene triamine, ethylene diamine, triethylene tetraamine, hexamethylene diamine, tetraethylene pentamine, the diamines obtained by hydrogenation of the nitriles from polymeric fatty acids, 1,8-diaminodecane, 1,12-diaminododecane, 1,3,6-triaminooctane, and the like.

A detailed method for describing the above-noted polyamides may be found in U.S. 2,450,940 and U.S. 2,695,908.

Other examples of amine-type curing agents that may be used in the process of the invention include the adducts of polyamines, and particularly the above-noted aromatic polyamines, and monoepoxides. The monoepoxides used in preparing these adducts include those organic compounds having a single epoxy group in a terminal position, e.g., compounds having a single

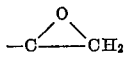

group. These compounds may be aliphatic, cycloaliphatic, aromatic or heterocyclic and may be sautrated or unsaturated. Examples of these monoepoxides include, among others, styrene oxide, phenyl glycidyl ether, allyl glycidyl ether, octadecyl glycidyl ether, amyl glycidyl ether, tolyl glycidyl ether, chlorophenyl glycidyl ether, naphthyl ether, diacetate of monoglycidyl ether of glycerol, dipropionate of the monoglycidyl ether of glycerol, diacrylate of monoglycidyl ether of glycerol, 1,2-hexylene oxide, 1-heptylene oxide, epichlorohydrin, decylene oxide, octadecylene oxide, ethylene oxide, glycidyl acetate, glycidyl benzoate, glycidyl acrylate, glycidyl methacrylate, glycidyl methyl maleate, and the like.

Preferred monoepoxides to be used to prepare the new adducts comprise the monoepoxy-substituted hydrocarbons containing no more than 12 carbon atoms, the monoepoxy substituted alkyl ethers of hydrocarbon monohydric alcohols or phenols containing no more than 12 carbon atoms, and the monoepoxy-substituted alkyl esters of hydrocarbon monocarboxylic acids, the epoxy-subsituted alkyl esters of hydrocarbon polycarboxylic acids wherein the other carboxyl groups are esterified with alkanols, alkyl and alkenyl esters of 1,2-epoxy-monocarboxylic acids, epoxyalkyl ethers of polyhydric alcohols wherein the other OH groups are esterified or etherified with hydrocarbon acids or alcohols and monoesters of polyhydric alcohols and 1,2-epoxy monocarboxylic acids wherein the other OH groups are esterified or etherified with hydrocarbon acids or alcohols.

The adducts are prepared by combining any one or more of the above-described polyamines with one or more of the above-described monoepoxides and heating the resulting mixture. The mixture is preferably heated at temperatures between 50° C. and 150° C. and more preferably 80° C. and 200° C. for a short period and then allowed to stand. The reaction is usually effected under atmospheric pressure although superatmospheric pressure may be used especially with low monoepoxides and/or amines.

In order to obtain the desired novel adducts instead of gelled resinous masses which are useless as curing agents, it is necessary that an important detail be observed, namely, that a proper proportion of reactants be used. The complex soluble adducts having superior properites as curing agents are obtained only when the monoepoxide is reacted with the aromatic polyamine in a mol ratio greater than 1:2 and preferably in a mol ratio of at least 1:2.2.

The amount of the polyamine used should generally not exceed 10 mols per mol of monoepoxide and preferably not more than 5 mols, otherwise, the adduct fails to possess the above advantage as curing agents for polyepoxides.

In view of the critical character of the proportion of reactants, it is preferred to add the monoepoxide to the polyamine.

If the polyamine or monoepoxide is very viscous or solid, it may be desirable to effect the reaction in an inert solvent for the reactants and product. Dioxane and diethyl ether are particularly useful for this purpose.

The preparation of several of the adducts are given below by way of illustration:

ADDUCT OF MIXTURE OF META-PHENYLENE DIAMINE AND P,P'-METHYLENE DIANILINE AND PHENYL GLYCIDYL ETHER

A mixture of 1 part of meta-phenylene diamine and 1 part of p,p'-methylene diamine was prepared by melting the solids together at 98° C. 10 parts of phenyl glycidyl ether was added to 100 parts of above mixture and an exotherm developed. The solution cooled to give a clear reddish brown liquid of low viscosity e.a., 2500 centipoises.

ADDUCT OF MIXTURE OF M-PHENYLENE DIAMINE AND P,P'-METHYLENE DIANILINE AND STYRENE OXIDE

A mixture of 2 parts of m-phenylenediamine and 1 part of p,p'-methylene dianiline was prepared by melting the solids together at 90° C. 10 parts of styrene oxide was combined with 100 parts of this mixture and combined mixture heated in a reaction vessel to initiate the reaction. The product on cooling was a heavy syrup which was soluble in dioxane.

The activators for the above-described amine-type curing agents comprise generalized acidic material sometimes known as Lewis acids, such as, for example, Friedel-Crafts catalyst as the metal and metalloid halides as aluminum chloride, aluminum bromide, ferric chloride, zinc chloride, stannic chloride, titanium tetrachloride, and the like, as well as boron trifluoride and addition boron products of $BF_3$ and other materials. By far the more preferred activators, particularly because of the superior increase in rate of reaction obtained therewith, are the addition products of $BF_3$ and materials such as amines and phenols. The phenolic compounds may be mono- or polynuclear and mono- or polyhydric, such as, for example, phenol, bis-phenol, resorcinol, catechol, 2,2-bis(4-hydroxyphenyl) butane and the like. The nitrogen compound can be, for example, a primary, secondary or tertiary aliphatic amine, such as methylamine, dimethylamine, trimethylamine, 2-ethylhexylamine, stearylamine, allylamine, monoethanolamine, diethanolamine, triethanolamine, monoisopropanolamine, diisopropanolamine, triisopropanolamine, ethylenediamine, triethylenetetraamine, tetraethylenepentamine, aminoethylethanolamine, etc.; aromatic amines, such as o-phenylenediamine, m-phenylenediamine, p-phenylenediamine, o-toluidine, m-toluidine, p-toluidine, benzylamine, methylaniline, diphenylamine, triphenylamine, etc., pyridine, compounds having condensed pyridine rings, and their homologs and other derivatives, for example, alphapicoline, beta-picoline, gamma-picoline, the lutidines, such as 2,6-lutidine, the collidines, 2-ethanolpyridine, 4-ethanolpyridine, 2-hexylpyridine, 2-propanolpyridine, 4-propanolpyridie, 2-vinylpyridine, quinoline, isoquinoline, quinaldine, lepidine, etc., aminopyridines and homologs thereof, for example, 2-amino-3-methylpyridine, 2-amino-6-methylpyridine, 2-aminopyridine, etc.; cycloalkylamines, for example, cyclohexylamine, and dicyclohexylamine; piperidine; etc.

The $BF_3$ addition products may be prepared by conventional methods. The $BF_3$-amines, for example, may be prepared by passing $BF_3$ gas over or into a solution containing the amine, or they may be prepared by adding the amine dropwise to a reaction flask containing $BF_3$.

etherate and excess ether while keeping the mixture at a temperature of about 35° C. and after the reaction has subsided, removing the excess ether.

The preparation of some of the BF$_3$-amines is shown below.

BF$_3$-TRIETHYL AMINE

One mole of triethyl amine was added dropwise with stirring to a solution of 1 mole of BF$_3$ etherate diluted with excess diethyl ether at −20° C. The addition complex crystallized out of solution and was separated by filtration and washed with cold ether.

BF$_3$-DIMETHYL BENZYL AMINE

Thirty-four parts of dimethyl benzyl amine was dissolved in 25 parts of petroleum ether and agitated while BF$_3$ gas was passed over the surface. The temperature was kept below 15° C. by cooling. After four hours, 21.5 parts of a white powder were recovered by filtration.

BF$_3$-DIMETHYL ANILINE 60.5 g. (½ mol) of dimethyl aniline was stirred at a temperature of 10–20° C. while BF$_3$ gas was intermittently passed over the surface for 4½ hours. The resulting solid complex had a light green color.

BF$_3$-ETHYL ANILINE

BF$_3$ gas was bubbled into ethyl aniline at room temperature. When the BF$_3$ gas began to be given off in copious quantities, the addition was stopped and light vacuum applied. Resulting product was a viscous liquid complex of BF$_3$ and ethyl aniline.

BF$_3$-TRIMETHYL AMINE

Five parts of trimethyl amine were condensed in 110 parts of petroleum ether cooled to −50° C. BF$_3$ gas was added to this solution at a temperature below 6° C. until addition of further BF$_3$ resulted in no temperature rise. The white solid which had formed was filtered on a Büchner funnel and washed with cold petroleum ether.

BF$_3$-TRIPROPYL AMINE 72.5 g. (½ mol) of tripropyl amine were dissolved in 50 g. of petroleum ether (B.P. 25–65° C.). BF$_3$ gas was passed intermittently over the surface of the solution, which was agitated and cooled externally with ice to keep the temperature down below 6° C. After three hours, the white crystalline solid was filtered off, washed twice with petroleum ether and air dried.

BF$_3$-LAURYL AMINE 185 parts of lauryl amine was dissolved in 100 parts of toluene and treated with BF$_3$ gas at a temperature below 13° C. The complex was precipitated by the addition of petroleum ether.

BF$_3$-AMMONIA 200 parts of BF$_3$-diethyl ether complex (45 percent BF$_3$) and 200 parts of diethyl ether were agitated in a container and NH$_3$ gas was passed over the surface. The product was filtered and occluded gases removed by heating at 50° C. under vacuum. The product so obtained had a melting point above 250° C.

BF$_3$-PHENYLHYDRAZINE 75 parts of phenylhydrazine was dissolved in 200 parts of benzene and BF$_3$ gas was passed through until the reaction was complete. A white solid was recovered as the product.

BF$_3$-HEXANOLAMINE 50 parts of hexanolamine was placed in 200 parts of benzene. Boron trifluoride gas was passed through the solution with stirring until the reaction was complete. The crude product was a sticky material resembling diethylenetriamine-boron trifluoride in its appearance. The hexanolamine-boron trifluoride is soluble in butyl "Carbitol," acetone, methyl ethyl ketone, and water.

BF$_3$-DIETHYLENE TRIAMINE 151 parts (1 mole) of boron trifluoride-ether solution was placed in 200 parts of diethyl ether. 34 parts (½ mole) of diethylenetriamine in 70 parts of diethyl ether was then added slowly. The product separated as a gummy mass which became hard after the solvent escaped by air drying. The product was soluble in pyridine, methyl "Cellosolve," and water, being difficultly soluble in alcohol and methyl ethyl ketone. It could not be recrystallized. The melting point of the crude material was above 200° C.

BF$_3$ N-BUTYL AMINE 75 parts (½ mole) of boron trifluoride ether complex was added to 150 parts of diethyl ether. A solution of 36.5 parts of mono-n-butyl amine in 100 parts of diethyl ether was then very gradually added to this mixture with continued stirring. Upon filtering and drying, a white crystalline product was obtained.

BF$_3$-AMYLAMINE 87 parts (one mole) of amyl amine was dissolved in 200 parts of diethyl ether and 151 parts (one mole) of boron trifluoride-ether complex was added thereto very gradually with stirring. The solution was cooled and filtered and a white crystalline product was obtained.

BF$_3$-DECYLAMINE 75 parts (½ mole) of BF$_3$-ether complex was added to 150 parts of diethyl ether, and a solution of 78 parts (1 mole) of decyl amine in 100 parts of diethyl ether was added thereto with stirring. On cooling and filtering, a yellow solid wax was obtained.

BF$_3$-ANILINE 100 parts of aniline dissolved in 400 parts of benzene were placed in a 1-liter round bottom flask. Dry boron trifluoride gas was bubbled into the benzene solution, and the resulting crystals removed by filtration.

BF$_3$-MORPHOLINE

Eighty-seven parts (1 mole) of morpholine was stirred while 151 parts (1 mole) of a BF$_3$-ether complex (45 percent BF$_3$) in 100 parts of ethyl ether was added dropwise. On cooling the reaction mixture, an orange-yellow solid separated. The complex was washed with dry ethyl ether. It was insoluble in methyl ethyl ketone.

BF$_3$-BENZYL ANILINE

To a solution of 286 parts of benzyl aniline in 155 parts of anhydrous ether was added dropwise 200 parts of BF$_3$-ether complex (45 percent BF$_3$). The yellow precipitate was separated by filtration. This complex melted at 125–155° C. with decomposition.

BF$_3$-PYRIDINE

Sixty-nine parts (1 mole) of pyridine was stirred while 151 parts (1 mole) of BF$_3$-ether complex was added dropwise. The reaction was exothermic and the reaction mixture was cooled to aid precipitation of the complex. The white crystals which separated were collected on a filter and air dried.

According to the process of the invention, the polyepoxide is cured by admixing the above-described amine-type curing agents and the activator with the polyepoxide. The amount of the amine-type curing agent to be used in the process will vary over a wide range. Good cures are obtained by reacting the polyepoxide with at least .8 equivalent of the amine-type curing agent. As used herein relation to the amount of the amine-type curing agent, the expression "equivalent-amount" refers to that amount of the agent needed to furnish one amino-substituted hydrogen atom for every epoxy group in the polyepoxide to be involved in the cure. To obtain the best results, the amine-type curing agent should be employed in about at least a chemical equivalent amount, and more preferably in equivalent ratio of 1:1 to 1.5:1.

The activators, i.e., the Lewis acids, are needed only in very small amounts. Excellent results are obtained when the activator is utilized in amounts varying from .01% to 10% by weight of the resins, i.e., resin containing both polyepoxide and amine curing agent, and more preferably in amounts varying from 0.1% to 2% by weight of the resin.

In executing the process of the invention, it is desirable to have the polyepoxide in a mobile liquid condition when the amine-curing agent and activator are added in order to facilitate mixing. With those polyepoxides that are liquid, but too viscous for ready mixing, one may either heat to reduce viscosity, or have a liquid solvent added thereto in order to provide fluidity. Normally solid polyepoxides are likewise either melted or mixed with a liquid solvent. Various solvents are suitable for achieving the desired fluidity. They may be volatile solvents which escape from the polyepoxide composition containing the curing agent-activator mixture by evaporation before or during the curing, such as ketones as acetone, methyl ethyl ketone, methyl isobutyl ketone, isophorone, etc., esters such as ethyl acetate, butyl acetate, Cellosolve acetate (ethylene glycol monoacetate), methyl Cellosolve acetate, etc.; chlorinated hydrocarbons such as trichloropropane, chloroform, etc. Solvents which remain in the cured composition may also be used, such as diethyl phthalate, dibutyl phthalate or liquid monoepoxides, including glycidyl allyl ether, glycidyl phenyl ether, styrene oxide, 1,2-hexylene oxide, glycide, and the like, as well as cyano-substituted hydrocarbons, such as acetonitrile, propionitrile, adiponitrile, benzonitrile, and the like. It is also convenient to employ the solid or semi-solid polyepoxides in combination with a liquid polyepoxide. Various other ingredients may be mixed with the polyepoxide compositions including pigments, fillers, dyes, plasticizers, resins, and the like.

The cure may be effected over a wide range of temperatures. Some of the above-described curing agent-activator combinations are active near room temperature, e.g., about 15° C. to 20° C., and the cure may be accomplished by merely mixing the curing agent-activator combination, either alone or in admixture, with the polyepoxide and then letting the mixture stand at room temperature. In other cases, it may be advantageous to employ heat in order to obtain a satisfactory rate of cure. Excellent rates of cure are obtained at temperatures ranging from about 50° C. to 200° C. and these are preferred temperatures to be used. Temperatures much above 200° C. are generally not desirable but may be employed if necessary.

The curing agent-polyepoxide systems described above may be utilized for a great variety of important applications. Because of their rapid cure at the low temperatrues, they are particularly useful in the preparation of rapid cure coating compositions, such as enamels and the like. In this application, it is generally desirable to combine the polyepoxide with the curing agent and activator and desired solvents or other film-forming materials, and then apply this mixture to the surface to be coated. The coatings may be allowed to set at room temperature or heat may be applied.

The systems described above are also very useful in the preparation of electrical pottings and castings. They are particularly suitable for preparing very large castings as can be cured at low temperatures without liberation of large amounts of heat and this gives a more even cure which results in much stronger and more durable products. In this application, the mixture of polyepoxide, amine and activator alone or with suitable diluents is added to the desired mole or casting and then allowed to set at room temperature. Heat may be applied in some cases to hasten cure.

The above-described systems are also useful in the preparation of laminates. In this application, the sheets of fibrous material are first impregnated with the mixture of polyepoxide, amine and activator. This is conveniently accomplished by dissolving the amine and activator in acetone and mixing the solution with the polyepoxide so as to obtain a fluid mixture. The sheets of fibrous material are impregnated with the mixture by spreading it thereon or by dipping or otherwise immersing them in the impregnant. The solvent is conveniently removed by evaporation and the mixture is cured to the fusible resin stage. Although this operation may be conducted at room temperature (20 to 25° C.), it is preferred to use somewhat elevated temperature such as about 50° C. to 200° C. with the impregnated sheet stock passing through or hanging free in an oven or other suitable equipment. The resinification is arrested before infusible product occurs by cooling below about 40° C. A plurality of the impregnated sheets are then superposed and the assembly is cured in a heated press under a pressure of about 25 to 500 or more pounds per square inch. The resulting laminate is extremely strong and resistant against the action of organic and corrosive solvents. The fibrous material used in the preparation of the laminates may be of any suitable material, such as glass cloth and matting, paper, asbestos paper, mica flakes, cotton bats, duck muslin, canvas and the like. It is usually preferred to utilize woven glass cloth that has been given prior treatment with well known finishing or sizing agents, therefor, such as chrome methacrylate or vinyl trichlorosilane.

In the above applications, the resulting cured products are characterized by their hardness, high heat distortion values and durability.

The polyepoxides to be cured by use of the above process are those possessing at least two

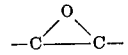

groups. These groups may be terminal, i.e.,

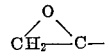

groups or they may be in an internal position. Preferably the epoxy groups are terminal. The polyepoxides may be saturated or unsaturated, aliphatic, cycloaliphatic, aromatic or heterocyclic and may be substituted if desired with substituents, such as chlorine atoms, hydroxyl groups, ether radicals, and the like. They may also be monomeric or polymeric.

For clarity, many of the polyepoxides and particularly those of the polymeric type will be described throughout the specification and claims in terms of epoxy equivalent value. The meaning of this expression is described in U.S. 2,633,458.

If the polyepoxide material consists of a single compound and all of the epoxy groups are intact, the epoxy equivalency will be integers, such as 2, 3, 4 and the like. However, in the case of the polymeric type polyepoxides many of the materials may contain some of the monomeric monoepoxides or have some of their epoxy groups hydrated or otherwise reacted and/or contain macromolecules of somewhat different molecular weight so the epoxy equivalent values may be quite low and contain fractional values. The polymeric material may, for example, have epoxy equivalent values, such as 1.5, 1.8, 2.5, and the like.

Various examples of polyepoxides that may be used in the process of the invention are given in U.S. 2,633,458 and it is to be understood that so much of the disclosure of that patent relative to examples of polyepoxides is incorporated by reference into this specification.

The glycidyl polyethers of polyhydric phenols obtained by condensing the polyhydric phenols with epichlorohydrin as described in U.S. 2,633,458 are also referred to as "ethoxyline" resins. See Chemical Week, vol. 69, page 27, for September 8, 1951.

A group of polyepoxides not specifically illustrated in the above-noted patent comprises the glycidyl ethers of novalac resins which resins are obtained by condensing an aldehyde with a polyhydric phenol. A typical member of this class is the epoxy resin from formaldehyde 2,2-bis(5-hydroxyphenol)propane novalac resin which contains as predominant constituent the substance represented by the formula

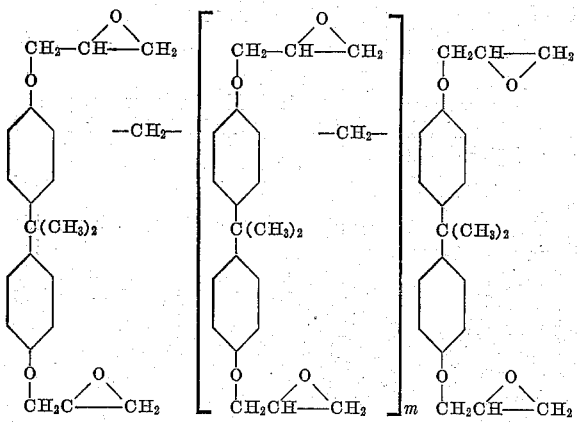

wherein $m$ is a value of at least 1.0. For the nature and preparation of novalac resins, see the book by T. S. Carswell, Phenoplasts, 1947, page 29, et seq.

Another group of polyepoxides include the glycidyl polyethers of a polyhydric phenol which has two hydroxyaryl groups separated by an aliphatic chain of at least six carbon atoms in the chain and with the chain being attached by carbon-to-carbon bonding to a nuclear carbon atom of the hydroxyl aryl groups. Suitable phenols used for preparing these resins comprise those obtained by condensing phenol with a phenol having an aliphatic side chain with one or more olefinic double bonds positioned in the chain so the required separating atoms are present between two hydroxyphenol groups of the resulting polyhydric phenol. Cardanol, obtainable in known manner from cashew nut shell liquid, is a convenient source of phenols containing such side chain. Mixed grades of cardanol containing about equal amounts of m-(8-pentadecenyl) phenol and a phenol with a 15 carbon atom side chain having two double bonds similarly removed from the aromatic nucleus are available from the Irvington Varnish and Insulator Co.

To illustrate the manner in which the invention may be carried out, the following examples are given. It is to be understood, however, that the examples are for the purpose of illustration and the invention is not to be regarded as limited to any of the specific compounds or conditions recited therein. Unless otherwise specified, parts disclosed in the examples are parts by weight.

The soluble pourable polyamide of dimerized soybean oil acids and diethylene triamine referred to in the examples is General Mills Resin 115 having the following properties: Gardner-Holdt viscosity of about 10, mol weight of about 1307 and contains about 10.7% nitrogen.

Polyether A, B, C, etc. described in the examples are the polyepoxides described in U.S. 2,633,458 under these titles.

*Example I*

This example illustrates the unexpectedly high rate of cure that is obtained by using an adduct of a mixture of meta-phenylene diamine and p,p'-methylene dianiline and phenyl glycidyl ether (prepared as shown above) in combination with BF$_3$-ethylaniline.

1 part of BF$_3$-ethyl aniline was mixed with 20 parts of the adduct and this mixture was then added to 100 parts of Polyether A. A portion of this mixture was heated at 80° C. and it gelled hard in 5 minutes. Another portion of the mixture was cured for 2 hours at 80° C. followed by 2 hours at 150° C. The resulting product exhibited a heat distortion point of 147° C.

The above experiment was repeated in the absence of the BF$_3$-ethyl aniline. This mixture was heated at 80° C. took 48 minutes to gell. After heating to 150° C. as noted above, the product had a heat distortion point of 143° C.

In another experiment one part of BF$_3$-ethyl aniline was mixed with 100 parts of Polyether A, and the mixture heated at 80° C. A gummy gel was obtained in 25 minutes.

*Example II*

This example illustrates the unexpectedly high rate of cure that is obtained by using diamino diphenyl sulphone in combination with BF$_3$-ethyl aniline.

100 parts of Polyether A was combined with 30 parts of diamino diphenyl sulphone and 1 part of BF$_3$-ethyl aniline and the mixture heated to 80° C. This mixture gelled in 32 minutes.

The above experiment was repeated without the BF$_3$-ethyl aniline. In this case, the mixture did not gell until 27 hours at 80° C.

A similar rapid increase is obtained when the BF$_3$-ethyl aniline is replaced with equal amounts of each of the following: BF$_3$-ethylamine, BF$_3$-tri ethylamine and BF$_3$-benzyl dimethylamine.

*Example III*

This example illustrates the unexpectedly high rate of cure that is obtained by using hexamethylene diamine in combination with BF$_3$-ethyl aniline.

100 parts of Polyether A was combined with 15 parts of hexamethylene diamine and 1 part of BF$_3$-ethyl aniline and the mixture set up at room temperature in 10 minutes.

The above experiment was repeated without the BF$_3$-ethyl aniline. In this case, the mixture did not gell until 2 hours at room temperature.

Similar results are obtained by replacing the hexamethylene diamine with equivalent amounts of each of the following: 1,8-diaminooctane, triethylene tetraamine and pentamethylene diamine.

*Example IV*

This example illustrates the unexpectedly high rate of cure that is obtained by using the pourable soluble polyamide of dimeric acids and diethylene triamine as described above in combination with BF$_3$-ethyl aniline.

100 parts of Polyether A was combined with 100 parts of the polyamide and 1 part of BF$_3$-ethyl aniline added thereto. This mixture was heated to 80° C. and gelled in 7½ minutes. This was a faster cure than could be obtained with the polyamide or BF$_3$-amine alone.

*Example V*

100 parts of Polyether A is combined with 30 diamino diphenyl sulfone and 1 part of BF$_3$-phenol and the mixture heated to 80° C. This mixture gells in a few minutes and in a much shorter period than similar compositions containing the diamino diphenyl sulfone by itself and the BF$_3$-phenol by itself.

*Example VI*

100 parts of Polyether B is combined with 15 parts of hexamethylene diamine and 1 part of BF$_3$-ethyl aniline and the mixture sets up at room temperature in a few minutes. The gell time of the mixture is much shorter than that obtained with similar compositions containing hexamethylene diamine by itself and the BF$_3$-ethyl aniline by itself.

Similar results are obtained by replacing the BF$_3$-ethyl aniline in the above process with equivalent amounts of each of the following: $BF_3$-tripropyl amine, $BF_3$-lauryl amine, $BF_3$-hexanol amine, $BF_3$-diethylene triamine and $BF_3$-benzyldimethylamine.

*Example VII*

100 parts of Polyether B is combined with 12 parts of meta-phenylene diamine and 1 part of $BF_3$-ethyl aniline and the mixture heated to 100° C. This mixture gells in a few minutes and in a much shorter period than similar compositions containing the meta-phenylene diamine by itself and the $BF_3$-ethyl aniline by itself.

Similar results are obtained by replacing Polyether B with equivalent amounts of Polyether A.

*Example VIII*

100 parts of Polyether A is combined with 20 parts of the adduct of a mixture of meta-phenylene diamine and P,P'-methylene dianiline and styrene oxide (prepared as shown above) and 1 part of $BF_3$-benzyldimethylamine. This mixture is heated at 80° C. and it gells hard in a few minutes. The gell time is much shorter than that obtained with a similar composition containing the adduct and a similar composition containing the $BF_3$-benzyldimethylamine.

Similar results are obtained by replacing the $BF_3$-benzyldimethylamine in the above process with equivalent amounts of each of the following: $BF_3$-hexanolamine, $BF_3$-decylamine, $BF_3$-diethylene triamine and $BF_3$-pyridine.

*Example IX*

100 parts of Polyether B is combined with 20 parts of an adduct of meta-phenylene diamine and allyl glycidyl ether and 1 part of $BF_3$-ethyl aniline. A portion of this mixture is heated at 80° C. and gelled in a few minutes. The gel time is shorter than that obtained with a similar composition containing the adduct and a similar composition containing the $BF_3$-ethyl aniline.

Similar results are obtained by replacing the Polyether B with equivalent amounts of each of the following: Polyether A, Polyether C and Polyether D.

*Example X*

100 parts of Polyether A is combined with 100 parts of a soluble pourable polyamide of dimerized soybean oil acids and hexamethylene diamine and 1 part of $BF_3$-ethylamine and the mixture heated to 80° C. This mixture gelled in a few minutes.

Similar results are obtained by replacing the $BF_3$-ethylamine with equal amounts of each of the following: $BF_3$-urea, $BF_3$-piperidine and $BF_3$-benzyldimethylamine.

We claim as our invention:

1. A process for resinifying and curing a polyepoxide having a 1,2-epoxy equivalency greater than 1.0 which comprises mixing and reacting at a temperature of 15° C. to 200° C. the polyepoxide with at least .8 equivalent of an epoxy curing agent containing a plurality of hydrogen attached to amino nitrogen and being selected from the group selected from aliphatic, cycloaliphatic, and aromatic amines, amino-containing soluble polyamides of dicarboxylic acids and polyamines and soluble adducts of polyamines and monoepoxides having a single 1,2-epoxy group and an activator for the curing agent comprising .01% to 10% by weight, based on the combined weight of the polyepoxide and epoxy curing agent, of an addition product of $BF_3$ selected from the group consisting of reaction products of $BF_3$ and amines and reaction products of $BF_3$ and phenols, the word "equivalent" used herein referring to the amount of epoxy curing agent needed to furnish one amino hydrogen per epoxy group of the polyepoxide.

2. A resinous product obtained according to the process of claim 1.

3. A process for resinifying and curing a polyepoxide having a 1,2-epoxy equivalency greater than 1.0 which comprises mixing and reacting at a temperature of 15° C. to 200° C. the polyepoxide with at least .8 equivalent of a soluble adduct of a polyamine and a monoepoxide having a single 1,2-epoxy group, the mono epoxide and polyamine being employed in a mol ratio between 1:2 and 1:10 in preparation of said adduct, and an activator therefor comprising .01% to 10% by weight, based on the combined weight of the polyepoxide and soluble adduct of the polyamine and monoepoxide, of an addition product of $BF_3$ selected from the group consisting of products of $BF_3$ and amines and products of $BF_3$ and phenols, the word "equivalent" used herein referring to the amount of epoxy curing agent needed to furnish 1 amino hydrogen per epoxy group of the polyepoxide.

4. A process as defined in claim 3 wherein the polyepoxide is a glycidyl polyether of a polyhydric phenol.

5. A process as defined in claim 3 wherein the adduct of the polyamine is an adduct of a mixture of meta-phenylene diamine and P,P'-methylene dianiline and phenyl glycidyl ether.

6. A process as defined in claim 3 wherein the $BF_3$-complex is $BF_3$-ethylaniline.

7. A process for resinifying and curing a polyepoxide having a 1,2-epoxy equivalency greater than 1.0 which comprises mixing and reacting at a temperature of 15° C. to 200° C. the polyepoxide with at least .8 equivalent of a soluble pourable polyamide containing free amino groups and an activator therefor comprising .01% to 10% by weight, based on the combined weight of the polyepoxide and the soluble pourable polyamide, of an addition product of $BF_3$ and a phenol, the word "equivalent" as used herein referring to the amount of soluble pourable polyamide needed to furnish 1 amino hydrogen per epoxy group of the polyepoxide.

8. A process for resinifying and curing a glycidyl polyether of a polyhydric compound of the group consisting of polyhydric phenols and polyhydric alcohols which comprises mixing and reacting at a temperature of 15° C. to 200° C. the glycidyl polyether with at least a chemical equivalent amount of an amino-containing curing agent of the group consisting of aliphatic, cycloaliphatic and aromatic amines, amino-containing soluble polyamides of dicarboxylic acids and polyamines, and soluble adducts of polyamines and monoepoxides having a single 1,2-epoxy group and an activator therefor comprising .01% to 10% by weight based on the weight of the glycidyl polyether and the amino-containing curing agent, of an addition product of $BF_3$ selected from the group consisting of products of $BF_3$ and amines and products of $BF_3$ and phenols, the expression "chemical equivalent" used herein referring to the amount of the amino-containing agent needed to furnish 1 amino hydrogen per epoxy group.

9. A process as in claim 8 wherein the activator is $BF_3$-phenol.

10. A process as in claim 8 wherein the activator is $BF_3$-ethylamine.

11. A process as in claim 8 wherein the amino-containing curing agent is an aromatic diamine.

12. A process as in claim 8 wherein the amino-containing curing agent is a pourable liquid polyamide of a dimeric acid and an aliphatic diamine containing free amino groups.

13. A process as in claim 8 wherein the amino-containing curing agent is an adduct of a mixture of meta-phenylene diamine and P,P'-methylene dianiline and a monoepoxide having a single 1,2-epoxy group.

14. A heat curable composition comprising a polyepoxide having a 1,2-epoxy equivalency greater than 1.0, at least .8 equivalent of an epoxy curing agent having a plurality of hydrogen attached to amino nitrogen and being selected from the group selected from aliphatic, cycloaliphatic, and aromatic amines, amino-containing soluble polyamides of dicarboxylic acids and polyamines and soluble adducts of polyamines and monoepoxides having a single 1,2-epoxy group and an activator for the curing agent comprising .01% to 10% by weight, based on the weight of the polyepoxide and the epoxy curing agent, of an addition product of $BF_3$ selected from the group consisting of reaction products of $BF_3$ and amines and reaction products of $BF_3$ and phenols, the word "equivalent" used herein referring to the amount of the epoxy curing agent needed to furnish one amino hydrogen per epoxy group of the polyepoxide.

References Cited in the file of this patent

UNITED STATES PATENTS

| | | |
|---|---|---|
| 2,528,932 | Wiles et al. | Nov. 7, 1950 |
| 2,717,885 | Greenlee | Sept. 3, 1955 |

FOREIGN PATENTS

| | | |
|---|---|---|
| 133,819 | Australia | Aug. 10, 1949 |

OTHER REFERENCES

Moeller: Inorganic Chemistry, Wiley, 1952, pages 326–328. (Copy in Scientific Library.)